United States Patent [19]
Baek et al.

[11] Patent Number: 5,984,257
[45] Date of Patent: Nov. 16, 1999

[54] FLUID FLOW REGULATING VALVE USING THERMAL EXPANSION MATERIAL

[75] Inventors: Oh-Hyun Baek, Seoul; Woong-Lin Hwang, Gunpo; Jae-Ho Moon, Seoul, all of Rep. of Korea

[73] Assignee: Samsung Electronics Co., Ltd., Suwon, Rep. of Korea

[21] Appl. No.: 08/908,945

[22] Filed: Aug. 8, 1997

[30] Foreign Application Priority Data

May 17, 1997 [KR] Rep. of Korea ................ 97-19124

[51] Int. Cl.⁶ ........................................... F16K 31/04
[52] U.S. Cl. .................... 251/11; 60/528; 236/68 C; 236/99 A; 236/101 R; 251/129.01
[58] Field of Search .................. 251/11, 129.01; 60/527, 528, 530; 236/68 C, 99 R, 99 A, 101 R

[56] References Cited

U.S. PATENT DOCUMENTS

| 2,989,281 | 6/1961 | Fritts | 251/11 |
| 4,027,848 | 6/1977 | Mundil | 251/11 |
| 4,053,136 | 10/1977 | Perl | 251/11 |
| 4,096,993 | 6/1978 | Behr | 251/11 |
| 4,943,032 | 7/1990 | Zdeblick . | |
| 5,029,805 | 7/1991 | Albarda et al. | 251/11 |
| 5,058,856 | 10/1991 | Gordon et al. | 251/11 |
| 5,069,419 | 12/1991 | Jerman | 251/11 |
| 5,325,880 | 7/1994 | Johnson et al. | 251/11 |
| 5,419,133 | 5/1995 | Schneider | 251/11 |

*Primary Examiner*—George L. Walton
*Attorney, Agent, or Firm*—Burns, Doane, Swecker & Mathis, L.L.P.

[57] ABSTRACT

A fluid flow regulating valve using a thermal expansion material. The valve includes a body provided with inlet and outlet ports; a displacement control part in the body, the displacement control part containing the thermal expansion material and displaced toward the outlet port when the thermal expansion material expands, thereby regulating a degree of opening of the outlet port; and a heater for heating the thermal expansion material within the displacement control part. The displacement control part includes a container containing the thermal expansion material, the container being coupled to the body and an expansion plate for regulating the degree of opening of the outlet port by being expanded in accordance with an expansion of the thermal expansion material, the expansion plate being hermetically coupled to the container.

13 Claims, 11 Drawing Sheets

FLUID FLOW REGULATING VALVE USING THERMAL EXPANSION MATERIAL

BACKGROUND OF THE INVENTION

(1) Field of the Invention

The present invention relates to a fluid flow regulating valve, and more particularly, to a fluid flow regulating valve using thermal expansion material which can precisely regulate the flow of large and small amounts of fluid.

(2) Description of the Related Art

Figure 10:
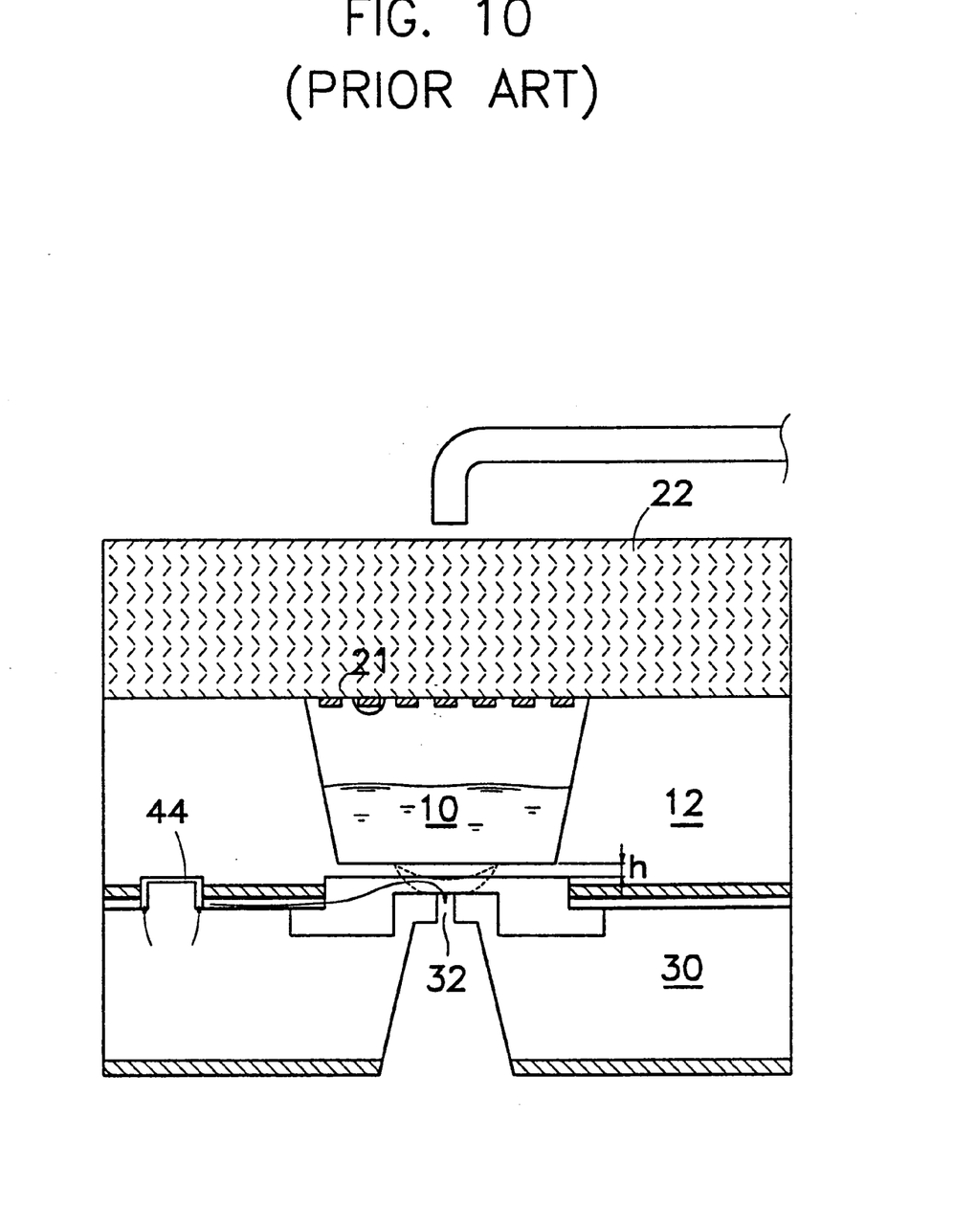
FIG. 10 is a view showing a conventional fluid flow regulating valve.

A conventional flow regulating valve using thermal material is disclosed in U.S. Pat. No. 4,943,032. Reference to FIG. 10 will be made to describe this patent.

The flow regulating valve comprises a first silicon wafer 12, a Pyrex wafer 22 attached on an upper side of the first silicon wafer 12, and a second silicon wafer 30 attached on a lower side of the first silicon wafer 12. A chamber 10 for receiving thermal expansion material is etched in the first silicon wafer 12 and a cavity 21 for receiving a heater 21 is etched in an area between the chamber 10 and the Pyrex wafer 22. A thickness (h) of an area 12a between the first silicon wafer 12 and the chamber 10 etched therein is extremely thin to where it is only a few $\mu$m. Also, a slot 44 for allowing flow of fluid is formed in an area where the first silicon wafer 12 and the second silicon wafer 30 are attached, and a nozzle 32 is etched in the second silicon wafer 30 at a location next to the area 12a under the chamber 10.

With regard to the operation of the above fluid regulator, when light is supplied to the Pyrex wafer 22 through a light pipe 19 or when the heater 21 is operated, the material contained in the chamber 10 expands. This acts to expand the area 12a of the first silicon wafer 12, as it is the thinnest part thereof, in a direction toward the nozzle 32. As a result, fluid entering through an inlet port 46 then sent to the nozzle 32 through the slot 44 is regulated according to the degree of expansion of the area 12a under the chamber 10.

In the above prior art valve, the heater 21, the chamber 10, and the slot 44 are either etched or go through a microscopic silicon process such as a photographic process. However, these processes require the use of very expensive equipment.

Also, the microscopic silicon process is a technique used for valves that regulate only a small flow of fluid. Valves manufactured by this process are used in medical instruments, environmental analysis instruments and the like. As a result, the application of valves made using this process is limited.

In addition, to regulate a large flow of fluid, the capacity of both the silicon wafer and the Pyrex wafer for each valve should be enlarged. However, this greatly increases manufacturing costs.

Furthermore, since diameters of inlet and outlet ports and a slot are processed having minute dimensions, foreign substances contained in fluid can easily block passages, deteriorating the reliability of the products.

SUMMARY OF THE INVENTION

Therefore, the present invention is made in an effort to solve the above described problems.

It is an object of the present invention to provide a fluid flow regulating valve which can precisely regulate both small and large flows of fluid, whereby the valve can be used for regulating coolant flow in refrigerators or air conditioners.

It is another object of the present invention to provide a fluid flow regulating valve which is inexpensive.

To achieve the above objects, the present invention provides a fluid flow regulating valve comprising:

a body provided with inlet and outlet ports;

a displacement control part in said body, said displacement control part containing the thermal expansion material and displaced toward the outlet port when the thermal expansion material expands, thereby regulating a degree of opening of the outlet port; and heating means for heating the thermal expansion material within the displacement control part.

Preferably, the heating means comprises a heater and the displacement control part comprises adiabatic means for preventing heat of the thermal expansion material heated by the heater from being discharged to environment.

According to an embodiment of the present invention, said adiabatic means is made of adiabatic material covered on the displacement control part.

According to another embodiment of the present invention, said adiabatic means comprises a separating member disposed between the heater and the displacement control part so as to prevent the heater from directly contacting the displacement control part.

According to an embodiment of the present invention, the displacement control part comprises a container containing the thermal expansion material, said container being coupled to the body and an expansion plate for regulating the degree of opening of the outlet port by being expanded in accordance with an expansion of the thermal expansion material, said expansion plate being hermetically coupled to the container.

The container comprises a supporting plate coupled to the body and a compartment hoop, one end of which is attached on the supporting plate while the other end of which is attached on the expansion plate, thereby defining a space for containing the thermal expansion material.

According to another embodiment of the present invention, the displacement control part comprises a supporting plate coupled to the body and an expansion cover for regulating a degree of opening of the outlet port by being expanded according to an expansion of the thermal expansion material, said expansion cover being attached on the supporting plate to define a space for containing the thermal expansion material.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 1:
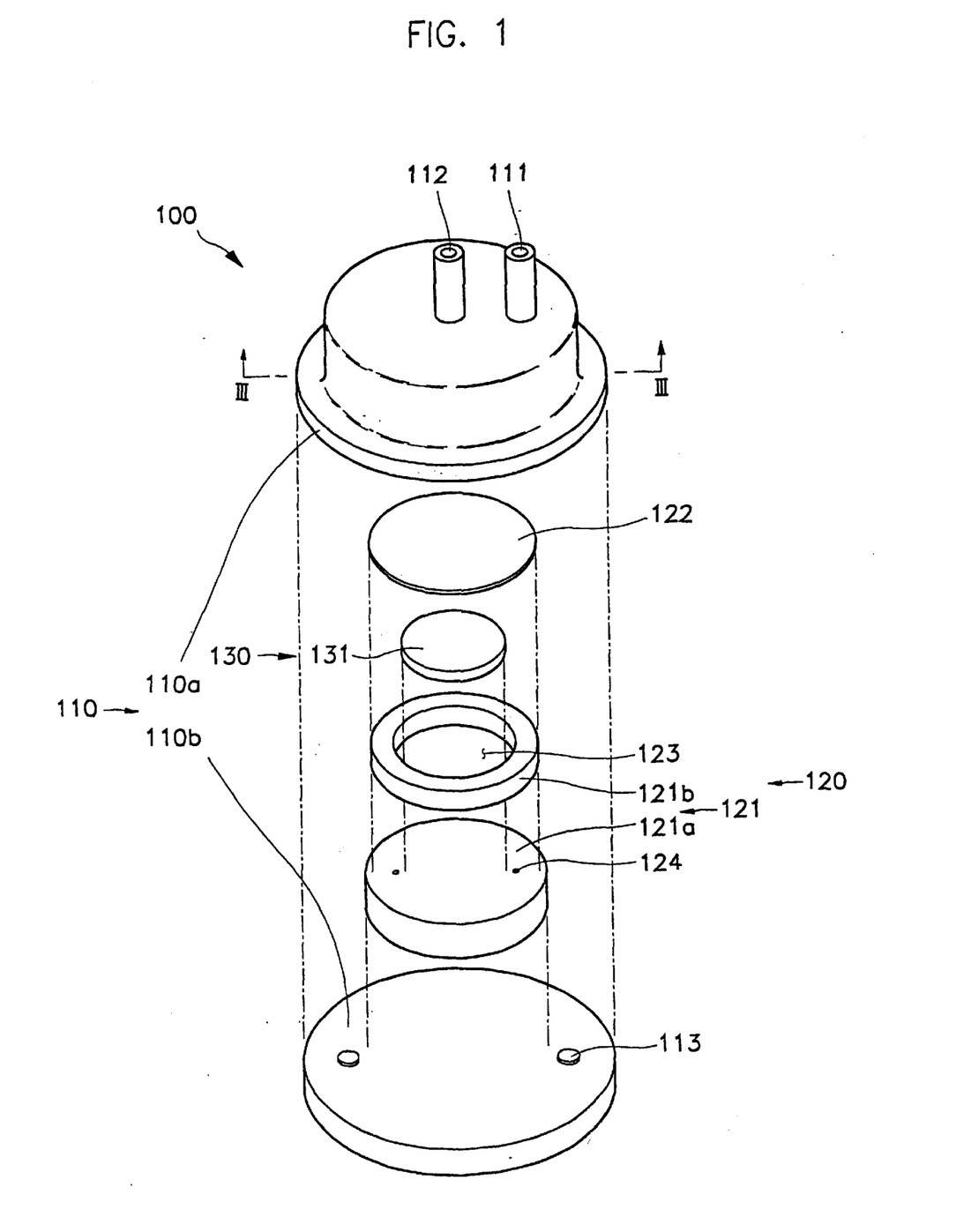
FIG. 1 is an exploded perspective view illustrating a flow regulating valve according to a first embodiment of the present invention.
Figure 2:
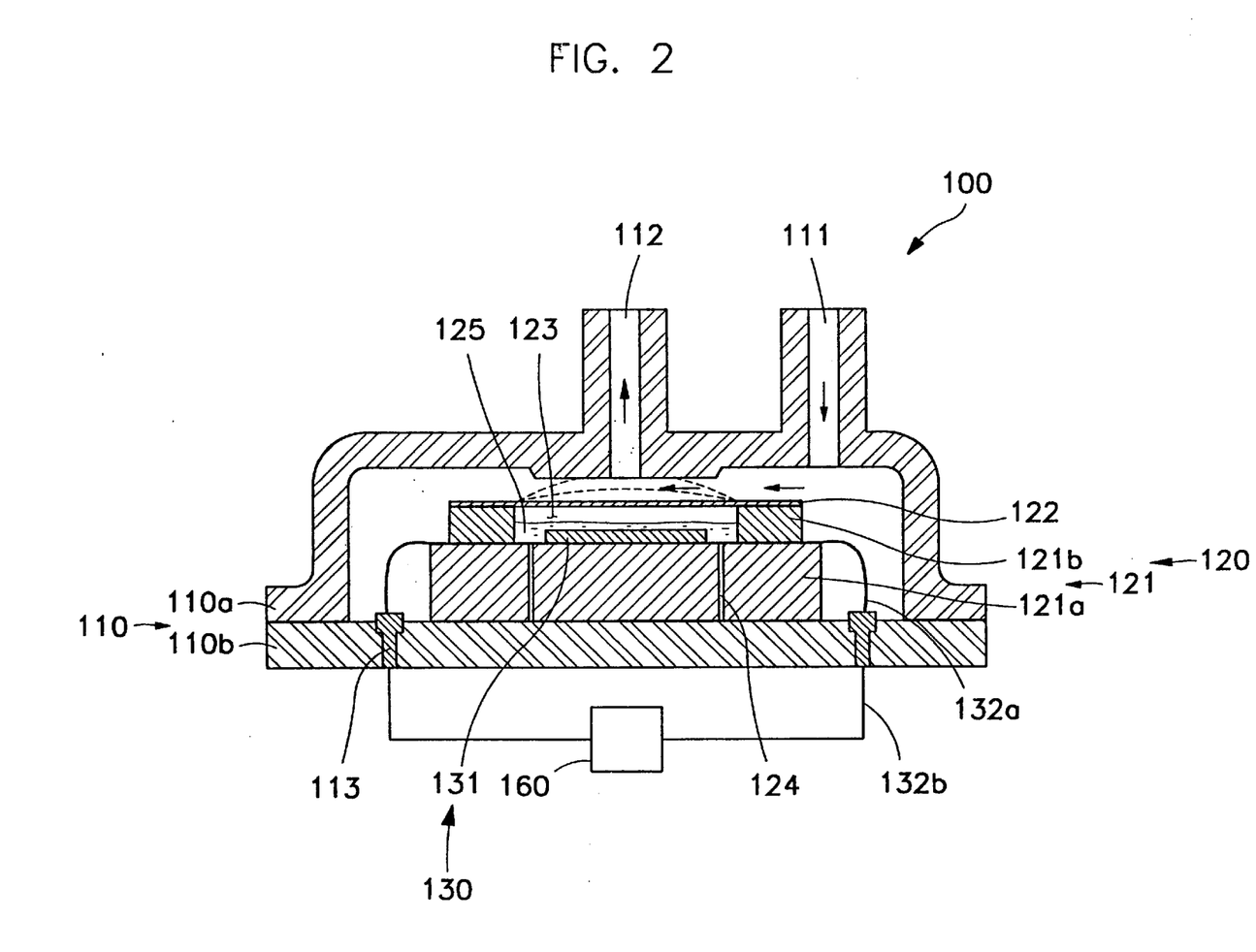
FIGS. 2 is a sectional view taken along line III—III of FIG. 1 when the valve is assembled.

Referring first FIGS. 1 and 2, there is shown a flow regulating valve according to a first embodiment of the present invention.

According to this embodiment, the inventive flow regulating valve 100 comprises a body 110, a displacement control part 120 holding thermal expansion material 125, and a heating member 130 heating the thermal expansion material 125. The thermal expansion material 125 expands by being heated by the heating member 130. When the thermal expansion material 125 expands, a side of the displacement control part 120 expands to block an outlet port 112, thereby regulating an amount of fluid to be discharged.

Describing more in detail, the body 110 comprises an upper body 110a and a lower body 110b coupled to the upper body 110a, and an enclosed space being defined between the upper and lower bodies 110a and 110b. The upper body 110a is provided with an inlet port 111 through which fluid enters the valve 100 and the outlet port 112 through which the fluid is discharged. The outlet port 112 is extended toward an inside of the upper body 110a so that it can be disposed closer to the displacement control part 120. A terminal 113 for connecting a power supply part 160 to the heating member 130 is provided in the lower body 110b.

The displacement control part 120 comprises a container 121 holding the thermal expansion material and an expansion plate 122 coupled to the container 121.

Figure 3:
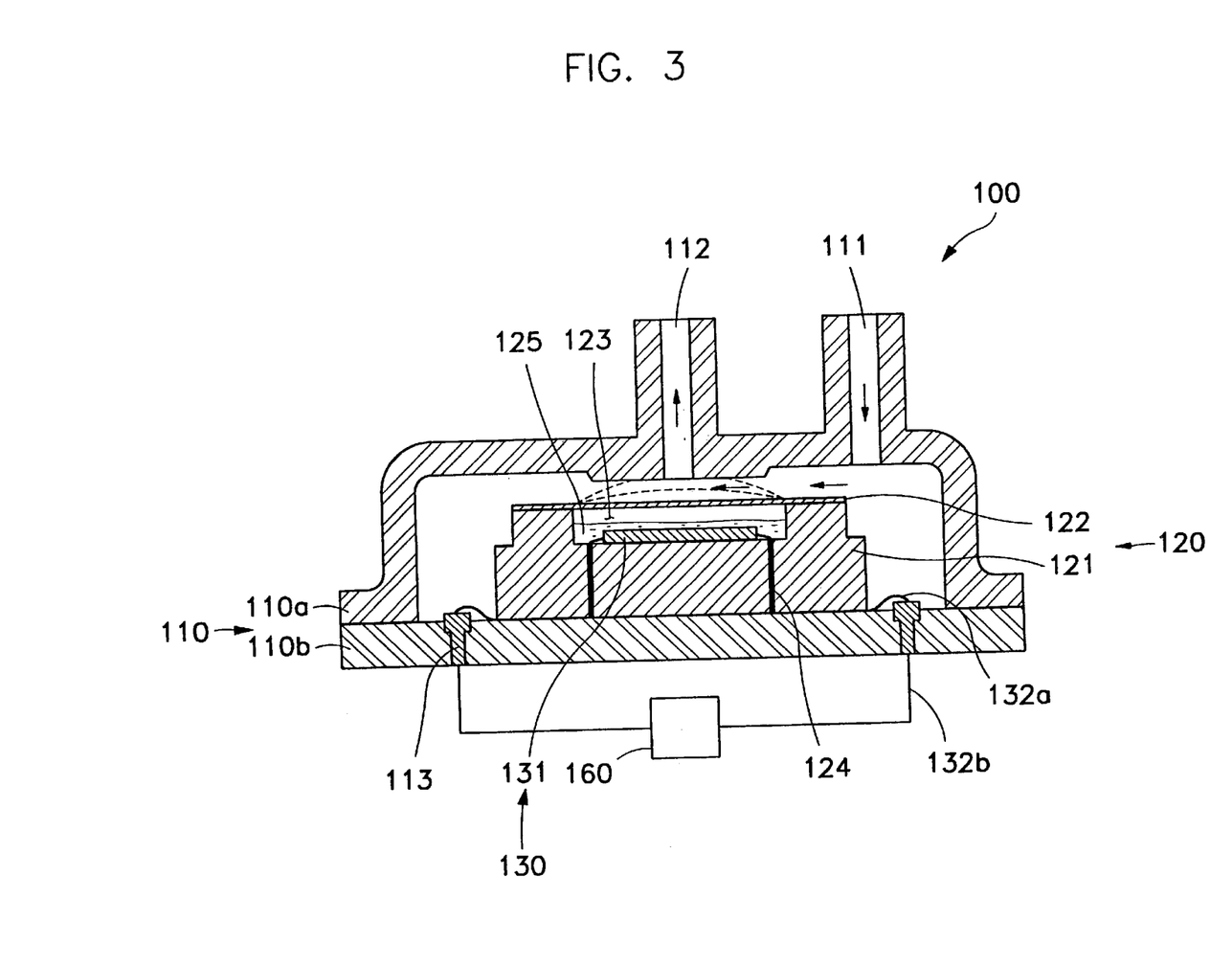
FIG. 3 is a sectional view illustrating a flow regulating valve according to a second embodiment of the present invention.

The container 121, as shown in FIGS. 1 and 2, includes a supporting plate 121a coupled to the lower body 110b and a compartment hoop 121b attached on the supporting plate 121a and defining a space in which the thermal expansion material 125 is contained. The expansion plate 122 is provided on the compartment hoop 121b. As shown in FIG. 3 illustrating a second embodiment of the present invention, the container 121 can be formed as an integral body defining a space 123 within which the thermal expansion material 125 is contained.

Referring again FIG. 2, the expansion plate 122 is attached on the compartment hoop 121b such that it is positioned opposite the outlet port 112.

The expansion plate 122 expands when the thermal expansion material 125 expands. It is preferable that the supporting plate 121a, the compartment hoop 121b, and the expansion plate 122 are attached to each other using acrylic resin or by brazing.

When the thermal expansion material contained within the space 123 is heated, pressure within the space 123 is increased by gas generated from the thermal expansion material 125. At this point, since the thermal expansion material 125 is enclosed within the airtight space 123, the expansion plate 122 is expanded or displaced due to the increased pressure. That is, the expansion plate 122 is expanded toward the outlet port 112, and, consequently, comes to contact and close the outlet port 112.

That is, as a clearance between the outlet port 112 and the expansion plate 112 is varied, the amount of fluid exhausted through the outlet port 112 is also varied. By regulating voltage applied to the heating member 130, the amount of fluid exhausted through the outlet port 112 can be regulated. Namely, when a large amount of voltage is applied to the heating member 130, the expansion plate 122 is expanded to reduce the size of the outlet port 112, thereby exhausting a small amount of fluid. The body 110 functions as a passage through which the fluid flows, while the expansion plate 122 functions as a regulator for regulating a sectional area of the passage.

Formed through the supporting plate 121a are injection ports 124 through which the thermal expansion material can be injected into the space 123. After hermetically enclosing the space 123 with the supporting plate 121a, the compartment hoop 121b, and the expansion plate 122a the thermal expansion material 125 is injected therein through the injection ports 124. Preferably, the thermal expansion material is a fluorine composition which is expandable at a relatively low temperature and does not easily react to other material.

The heating member 130 is mounted within the displacement control part 120 and includes a heater 131 which generates heat when voltage is applied thereto from an electric power source 160. The heater 131 is electrically connected to the terminal 113 through an electric wire 132a, and the terminal 113 is electrically connected to the electric power source 160 through another wire 132b, thereby allowing the application of voltage to the heater 131. The electric wire 132a passes through a contacting portion of the supporting plate 121a and the compartment hoop 121b as shown in FIG. 2, or passes through the injection port 124 formed on the container 121 as shown in FIG. 3.

Preferably, the displacement control part is made of material selected from the group consisting of metal and ceramic, both of which have high pressure-resistance characteristics.

Figure 4:
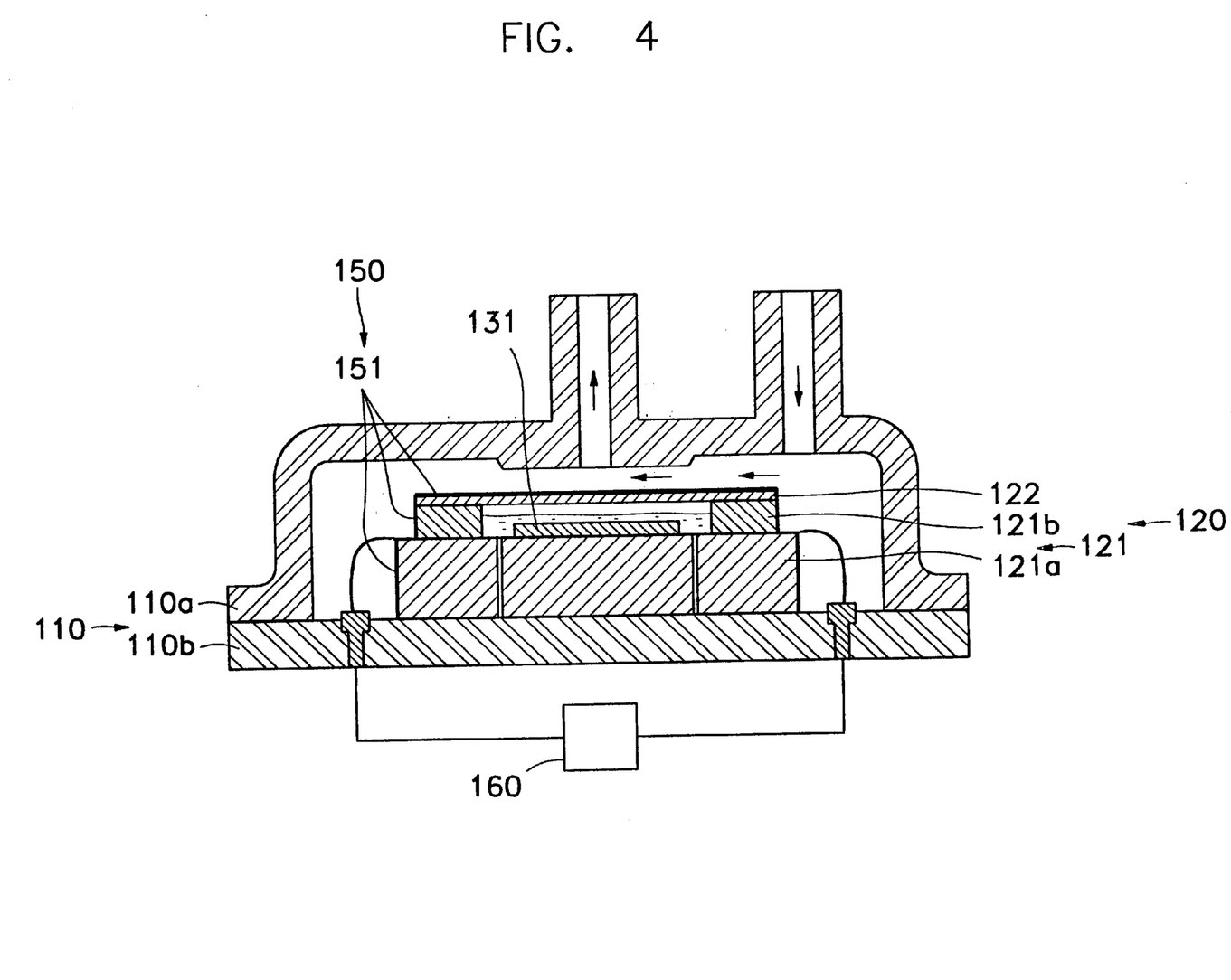
FIG. 4 is a sectional view illustrating a flow regulating valve according to a third embodiment of the present invention.
Figure 5:
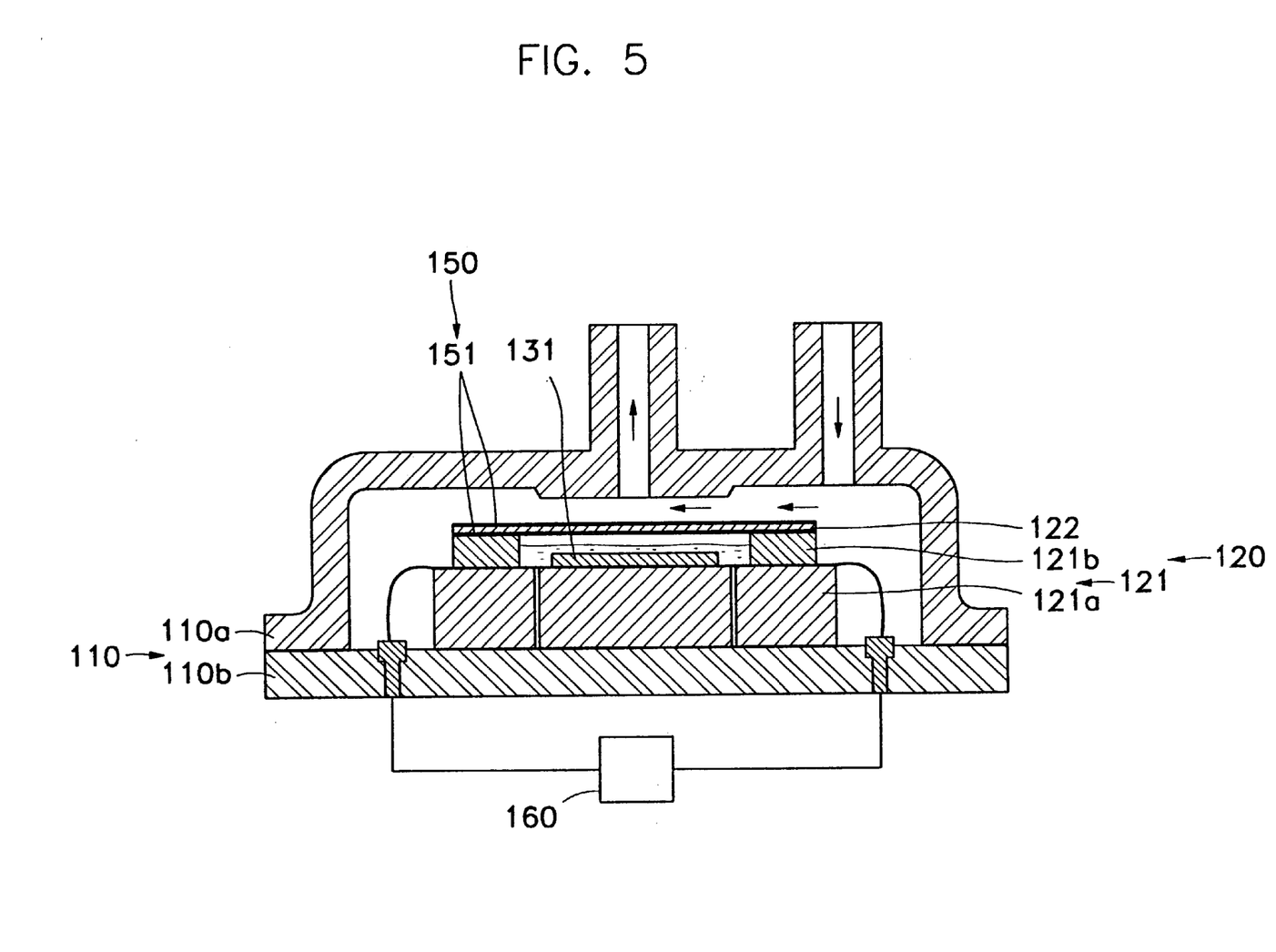
FIG. 5 is a sectional view illustrating a flow regulating valve according to a fourth embodiment of the present invention.

Referring to FIGS. 4 and 5, there are shown third and fourth embodiments of the present invention, respectively. The fluid flow regulating valves according to these embodiments may have adiabatic means which can prevent heat generated from the heater 131 from being discharged to the environment.

That is, adiabatic material 151 may be deposited or coated on whole outer surfaces of the displacement control part 120 as shown in FIG. 4, or deposited or coated on only the expansion plate 122 as shown in FIG. 5 if the supporting plate 121a and the compartment hoop 121b are formed having thicknesses sufficient to retain heat.

As described above, since the adiabatic member 150 is provided on the displacement control part 120, heat generated from the heater 131 cannot be discharged to the environment.

Figure 6:
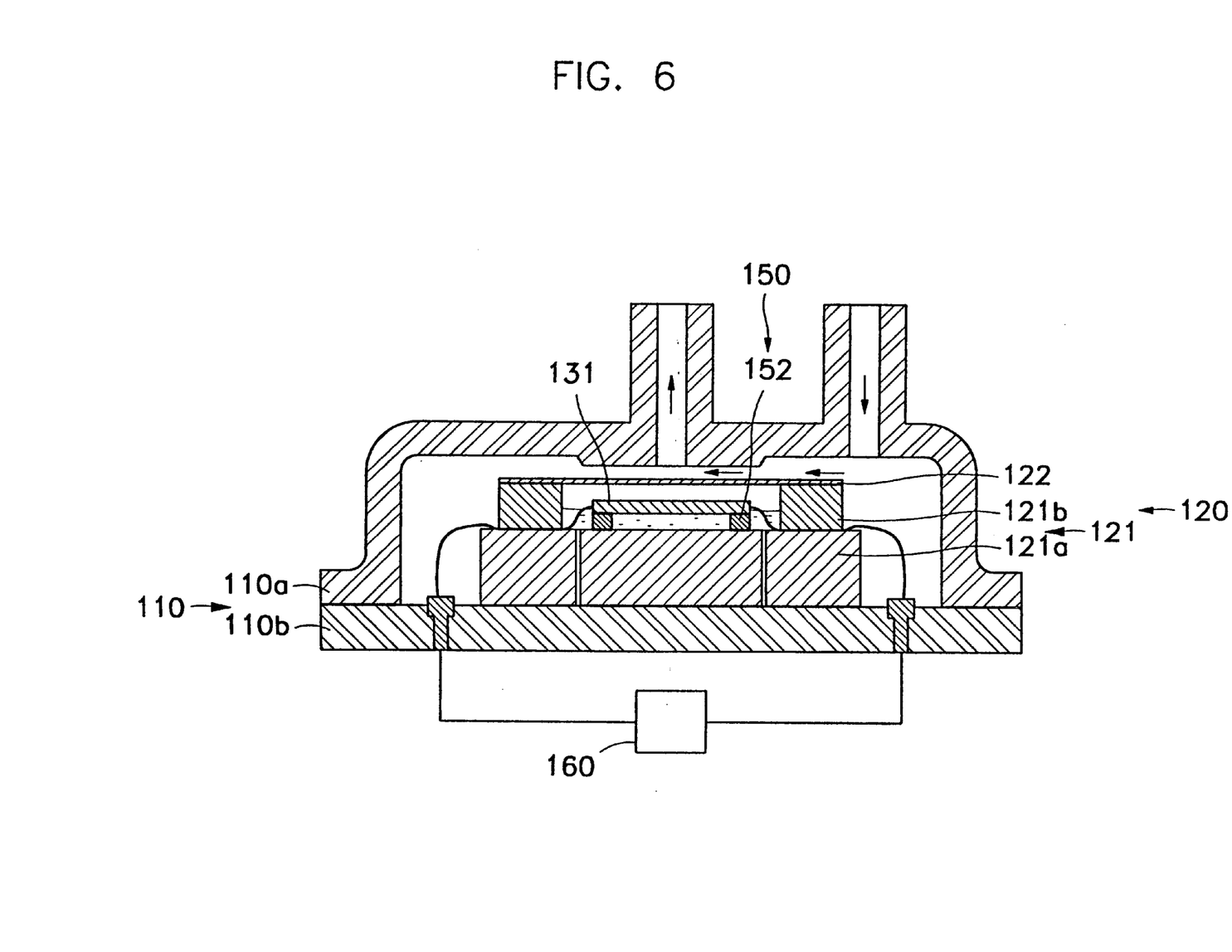
FIG. 6 is a sectional view illustrating a flow regulating valve according to a fifth embodiment of the present invention.

As shown in FIG. 6 illustrating a fifth embodiment of the present invention, a separating member 152 can be provided as the adiabatic means between the heater 131 and the supporting plate 121a so that heat cannot directly contact the supporting plate 121a. That is, since the separating member 152 is disposed between the heater 131 and the container 121, the heat generated from the heater 131 cannot be directly transmitted to the supporting plate 121a, thereby obtaining an adiabatic effect.

Figure 7:
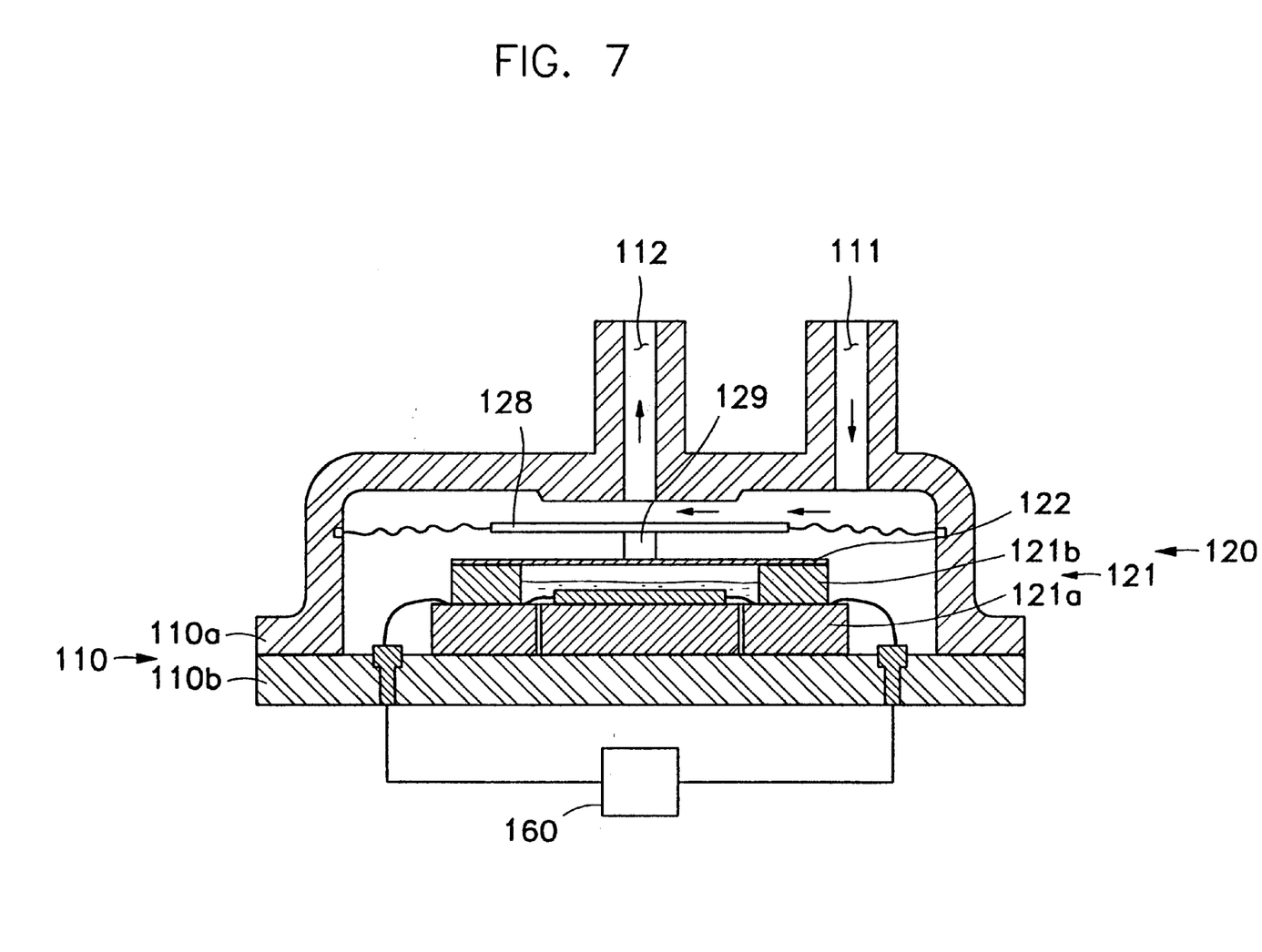
FIG. 7 is a sectional view illustrating a flow regulating valve according to a sixth embodiment of the present invention.

If a large difference in temperature between fluid directed to the body 110 and the displacement control part 120 results, since heat exchange between the fluid and the displacement control part 120 occurs, the amount of the expansion of the expansion plate 122 cannot be precisely controlled. To prevent this, as shown in FIG. 7 illustrating a sixth embodiment of the present invention, an auxiliary expansion plate 128 is provided between the inlet and outlet ports 111 and 112. The auxiliary expansion plate 128 is connected to the expansion plate 122 and expands as much as the expansion plate 122. Therefore, when the expansion plate 122 expands, the opening of the outlet port 112 is regulated by the auxiliary expansion plate 128. Reference numeral 129, which has not been described, denotes a connecting member for connecting the expansion plate 122 to the auxiliary expansion plate 128.

Figures 8, 8A:
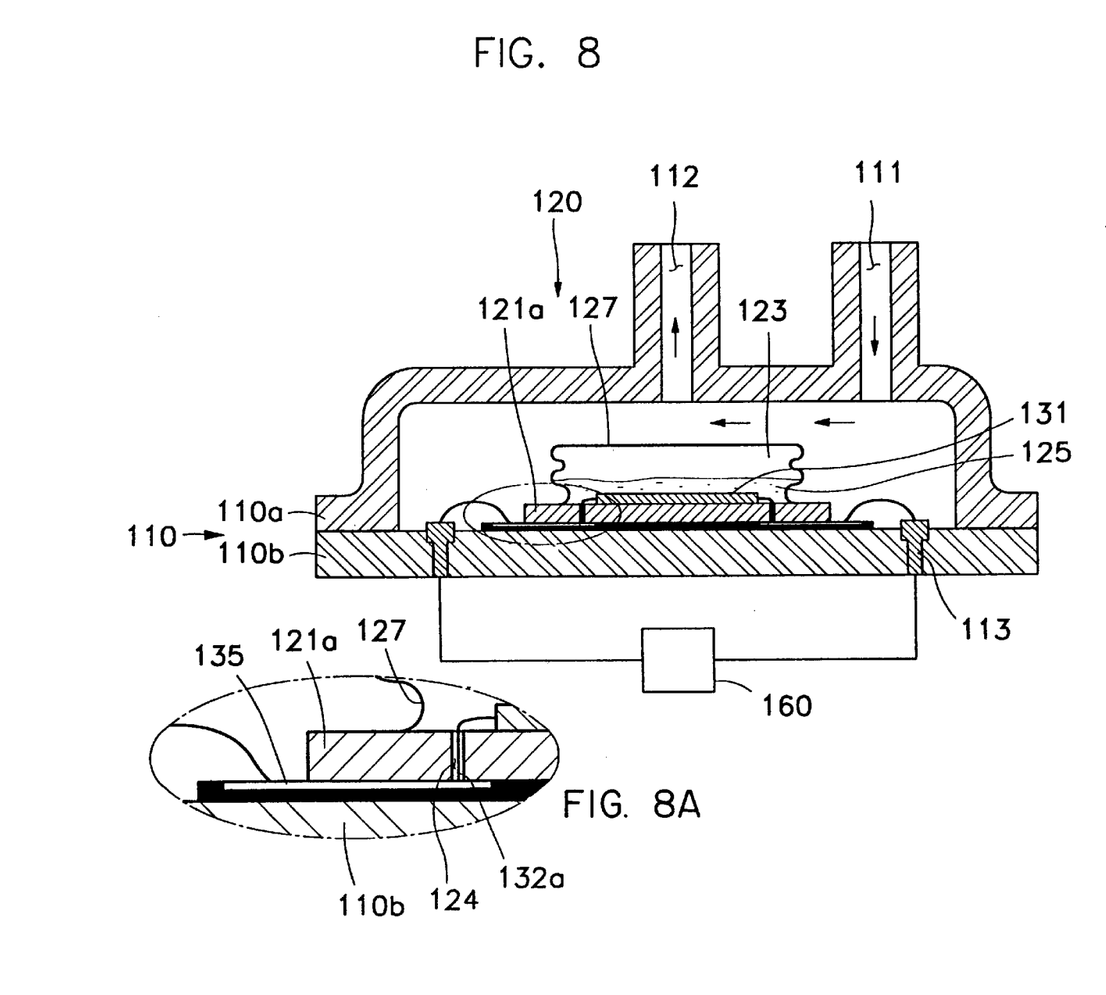
FIG. 8 is a sectional view illustrating a flow regulating valve according to a seventh embodiment of the present invention.
FIG. 8A is an enlargement of a circled portion of FIG. 8.

Referring to FIG. 8 illustrating a seventh embodiment of the present invention, the supporting plate 121a is coupled to the lower body 110b, and an expansion cover 127 is coupled to the supporting plate 121a. That is, the expansion cover 127 functions as the compartment hoop 121b and the expansion plate 122 of the preceding embodiments. The thermal expansion material 125 is contained in a space defined by the expansion cover 127 and the supporting plate 121a, and when the thermal expansion material expands, the expansion cover 127 also expands to regulate the opening of the outlet port 112. The expansion cover 127 is bellow-shaped so that this expansion cover 127 can be rapidly and precisely expanded in response to the expansion of the thermal expansion material. Further, the lower body 110b disposed between the terminal 113 and the inlet port 124 is provided with an electrode plate 135 so as to connect the terminal 113 to the heater 131.

Figure 9A:
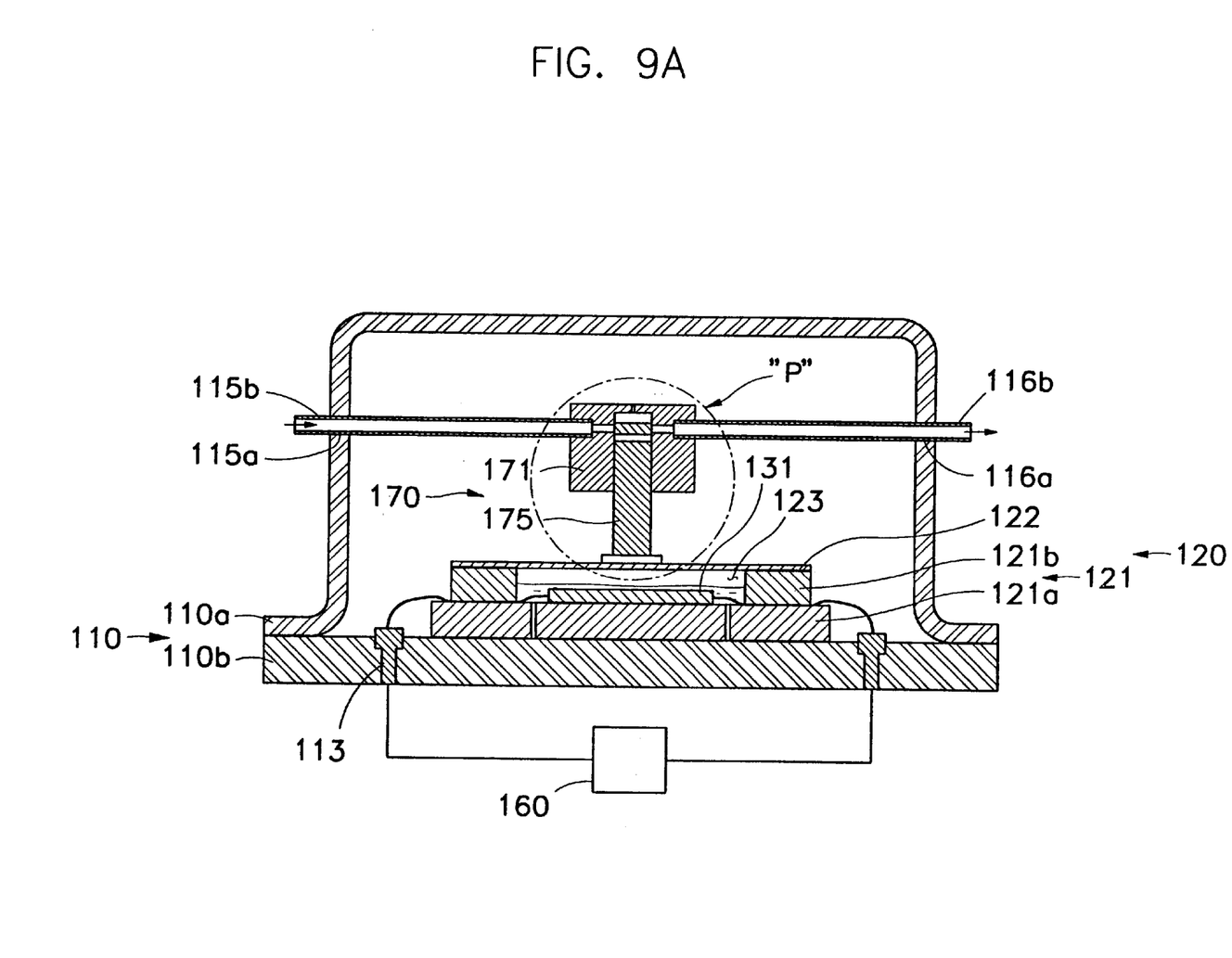
FIG. 9A is a sectional view illustrating a flow regulating valve according to an eighth embodiment of the present invention.
Figure 9B:
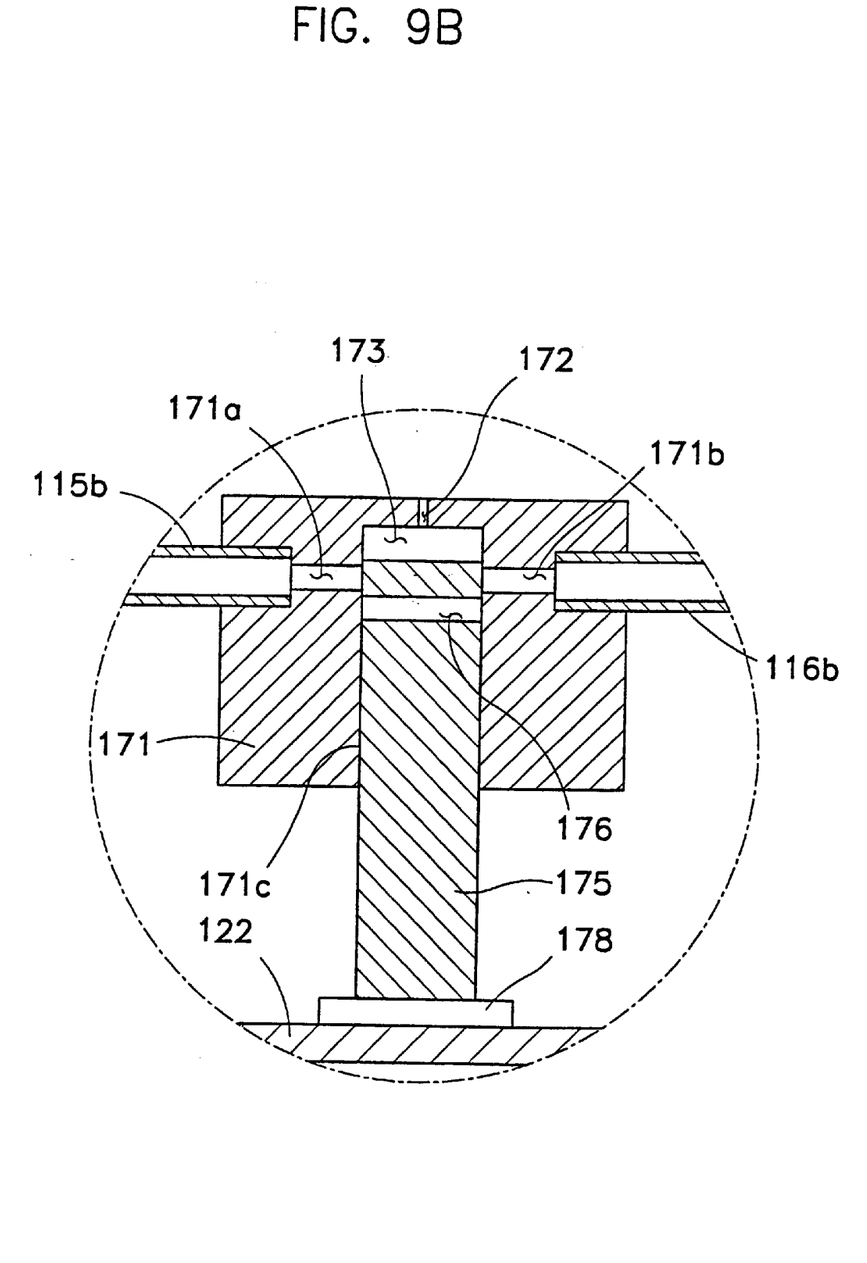
FIG. 9B is an enlarged view illustrating the circled portion "P" of FIG. 9A.

Referring to FIGS. 9A and 9B illustrating an eighth embodiment of the present invention, the valve is designed to communicate the inlet port 115a with the outlet port 116a from a normal closed position thereof.

As in the preceding embodiments, the body 110 comprises the upper and lower bodies 110a and 11b. The upper body 110a is provided with the inlet and outlet ports 115a and 116a. Inlet and outlet tubes 115b and 116b are respectively inserted passing through the inlet and outlet ports 115a and 116a.

The terminal 113 is provided on the lower body 110b and the container 121 with the heater 131 attached on the upper surface of the lower body 110b. Attached on the upper surface of the container 121 is the expansion plate 122 for hermetically enclosing the space defined by the container 121.

Provided on the expansion plate 122 is a selective communicating member 170 for selectively communicating the inlet port 115a and the outlet port 116 with each other. The selective communicating member 170 comprises a sleeve 171 supported by the inlet and outlet tubes 115b and 116b and a spool 175 for selectively communicating the inlet tube 115b and the outlet tube 116b with each other while reciprocating in accordance with the degree of the expansion of the expansion plate 122.

Formed through the sleeve 171 are inlet and outlet passages 171a and 171b (see FIG. 9B). The inlet passage 171a communicates with the outlet passage 171b through a hollow portion 171c of the sleeve 171. The inlet and outlet tubes 115b and 116b are further inserted into the inlet and outlet passages 171a and 171b, respectively. By this structure, the supporting of the sleeve 171 by the inlet and outlet tubes 115b and 116b is achieved. Formed on a portion of the sleeve above the inlet and outlet passages 171a and 171b is an exhaust hole 172 which allow the spool 175 to smoothly reciprocate by preventing a vacuum to be formed in a space defined by the sleeve 171 and the spool 175.

One end of the spool 175 is inserted into the hollow portion 171c, while the other end is coupled to the expansion plate 122. Therefore, when the expansion plate 122 is displaced toward the sleeve 171 by the expansion of the thermal expansion material, the spool 175 ascends, and when the thermal expansion material is returned to its initial condition, the spool 175 is displaced to its initial portion. The upper end of the spool 175 is positioned above the inlet and outlet passages 171a and 171b. A communicating passage 176 is formed on an appropriate position such that the inlet passage 171a is disconnected with the outlet passage 171b in the normal closed position of the spool 175, while the inlet passage 171a communicates with the outlet passage 171b in the ascended position of the spool 175. The communicating area of the inlet and outlet passages 171a and 171b is varied according to how high the spool 175 ascends, thereby regulating the amount of the fluid. Reference numeral 178 which has not been described denotes an connecting member.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A fluid flow regulating valve using a thermal expansion material, comprising:

a body provided with inlet and outlet ports;

a displacement control part in said body, said displacement control part containing the thermal expansion material and displaced toward the outlet port when the thermal expansion material expands, thereby regulating a degree of opening of the outlet port; and heating means for heating the thermal expansion material within the displacement control part;

wherein the displacement control part comprises:
a container containing the thermal expansion material, said container being coupled to the body, and
an expansion plate for regulating the degree of opening of the outlet port by being expanded in accordance with an expansion of the thermal expansion material, said expansion plate being hermetically coupled to the container;

wherein the container comprises:
a supporting plate coupled to the body, and
a compartment hoop, one end of which is attached on the supporting plate while the other end of which is attached on the expansion plate, thereby defining a space for containing the thermal expansion material.

2. A fluid flow regulating valve according to claim 1 wherein the heating means comprises a heater; and the displacement control part comprises adiabatic means for preventing heat of the thermal expansion material heated by the heater from being discharged to environment.

3. A fluid flow regulating valve according to claim 2 wherein said adiabatic means is made of adiabatic material covered on the displacement control part.

4. A fluid flow regulating valve according to claim 2 wherein said adiabatic means comprises a separating member disposed between the heater and the displacement control part so as to prevent the heater from directly contacting the displacement control part.

5. A fluid flow regulating valve according to claim 1 wherein the supporting plate is provided with an injection hole for injection of the thermal expansion material.

6. A fluid flow regulating valve according to claim 1 further comprising an auxiliary expansion plate for regulating a degree of opening of the outlet port by being expanded as much as the expansion plate and for preventing heat exchange between fluid directed onto the body and the displacement control part.

7. A fluid flow regulating valve using a thermal expansion material, comprising:

a body having upper and lower ends, said body being provided with inlet and outlet ports;

a displacement control part in said body, said displacement control part containing the thermal expansion material and being displaced toward the outlet port when the thermal expansion material expands, thereby regulating a degree of opening of the outlet port;

communicating control means for communicating or disconnecting the inlet and outlet ports with each other while moving upward and downward when the displacement control part is displaced; and heating means for heating the thermal expansion material;

wherein the displacement control part comprises:
 a supporting plate coupled to the body;
 a compartment hoop attached to the supporting plate for defining a space where the thermal expansion material is contained; and
 an expansion plate attached on the compartment hoop, said expansion plate expanding when the thermal expansion material expands.

8. A fluid flow regulating valve according to claim 7 wherein the supporting plate is provided with an injection hole for injection of the thermal expansion material.

9. A fluid flow regulating valve of claim 7 further comprising inlet and outlet tubes respectively inserted into the inlet and outlet ports, wherein said communicating control means comprises:

a sleeve having inlet and outlet passages respectively connected to the inlet and outlet tubes for selectively communicating the inlet and outlet tubes with each other, said sleeve being supported by the inlet and outlet tubes; and a spool having a first end coupled to the displacement control part and a second end inserted into the sleeve, said spool being movable such that the outlet passage can be selectively communicate with the inlet passage.

10. A fluid flow regulating valve according to claim 9 wherein said sleeve is provided with an exhaust hole for preventing a vacuum from being formed in a space within the sleeve.

11. A fluid flow regulating valve according to claim 10 wherein said spool is provided with a communicating hole for connecting the inlet passage to the outlet passage.

12. A fluid flow regulating valve using a thermal expansion material, comprising:

a body provided with inlet and outlet ports;

a displacement control part in said body, said displacement control part containing the thermal expansion material and displaced toward the outlet port when the thermal expansion material expands, thereby regulating a degree of opening of the outlet port; and heating means for heating the thermal expansion material within the displacement control part;

wherein the displacement control part comprises:
 a supporting plate coupled to the body; and
 an expansion cover for regulating a degree of opening of the outlet port by being expanded according to an expansion of the thermal expansion material, said expansion cover being attached on the supporting plate to define a space for containing the thermal expansion materal.

13. A fluid flow regulating valve according to claim 12 wherein said expansion cover is bellow-shaped and which can precisely and rapidly respond to the expansion of the thermal expansion material.

* * * * *